United States Patent
Seelenmeyer

Patent Number: 5,931,293
Date of Patent: Aug. 3, 1999

[54] COMPACT DISC PACKAGE

[76] Inventor: Sabine Seelenmeyer, Hansastr. 5, D-24118 Kiel, Germany

[21] Appl. No.: 08/952,997
[22] PCT Filed: May 22, 1996
[86] PCT No.: PCT/DE96/00930
§ 371 Date: Nov. 21, 1997
§ 102(e) Date: Nov. 21, 1997
[87] PCT Pub. No.: WO96/37892
PCT Pub. Date: Nov. 28, 1996

[51] Int. Cl.⁶ .................................................. B65D 85/57
[52] U.S. Cl. ........................................ 206/308.1; 206/312
[58] Field of Search ............................. 206/308.1, 309, 206/311–313

[56] References Cited

U.S. PATENT DOCUMENTS

| | | | |
|---|---|---|---|
| 2,881,912 | 4/1959 | Kursh | 206/312 |
| 3,422,952 | 1/1969 | George | 206/313 |
| 4,796,137 | 1/1989 | Gruehn et al. | 206/313 X |
| 4,850,731 | 7/1989 | Youngs . | |
| 5,048,681 | 9/1991 | Henkel . | |
| 5,101,973 | 4/1992 | Martinez . | |
| 5,119,933 | 6/1992 | Taylor . | |
| 5,147,036 | 9/1992 | Jacobs . | |
| 5,154,284 | 10/1992 | Starkey . | |
| 5,188,229 | 2/1993 | Bernstein . | |
| 5,655,656 | 8/1997 | Gottlieb | 206/308.1 |
| 5,657,867 | 8/1997 | Fu et al. | 206/308.1 |

FOREIGN PATENT DOCUMENTS

| | | |
|---|---|---|
| 4320191 | 1/1993 | Germany . |
| 2272887 | 6/1994 | United Kingdom . |
| WOA93/24931 | 12/1993 | WIPO . |

Primary Examiner—Bryon P. Gehman
Attorney, Agent, or Firm—Thomas M. Freiburger

[57] ABSTRACT

The invention relates to a folding CD package with a section (12) holding the CD, a cover section (10) hinged thereon and a pouch section (14) into which the section holding the CD can be inserted. According to the invention, the cover section (10) is attached to the pouch section (14) via an edge acting as a pivot (22) and the pivot (22) is released in relation to a hinged connection (20) between the cover section (10) and the section (12) holding the CD so that the section holding the CD is partly pulled out from the pouch section (14) when the package is opened by the resultant relative movement of the pivot and hinge for ease of removal.

20 Claims, 4 Drawing Sheets

COMPACT DISC PACKAGE

BACKGROUND OF THE INVENTION

The invention relates to a foldable compact disc (CD) package with a section holding the CD and a cover section hinged thereon.

CD packages are mostly sold in complex plastic covers. Packing materials like paperboard and paper, which are preferable for recycling purposes, are currently not used because they require special treatment. It is furthermore desirable to provide a package for the similar computer readable CD-ROMs; such package, when integrated into files, Leitz folders or books and magazines, must allow simple, user-friendly presentation of the CDs.

Here the use of a comparatively voluminous plastic container is not preferable.

DE 43 20 191 A1 discloses a paperboard CD package substantially formed like common plastic packages. The use of a flap joint complicates the removal of a CD.

U.S. Pat. No. 5,147,036 already discloses an insert section for a pouch-like CD package. Here a cover section can be folded around a CD previously inserted into the insert section. Together with the CD, this is then inserted into the pouch-like package. This packing method is, however, complicated and requires at least two removal steps, i.e. firstly removal from the pouch-like package and secondly, after unfolding the cover section, taking out of the insert section. A user may find this method comparatively awkward. It is also more expensive to produce two separate sections.

It is therefore an object of the present invention to provide a CD package made from mostly environment-friendly material with as little plastic share and weight as possible, which enables a user to easily remove the CD.

This object is accomplished by the features of the valid main claim, and especially by interspacing two pivot axes joining a pouch-like section and a cover section as well as a holding section.

The subclaims relate to advantageous embodiments of the present invention.

SUMMARY OF THE INVENTION

The CD is preferably positioned in a pouch provided with two interspaced pivots of a pouch-like section and a CD holding section of the CD package with a cover section, in order to assist an easier removal. There is no need for the snap fastener commonly known from plastic packages; this substantially reduces production costs and simplifies removal of the CD. A paperboard package is also less susceptible to fracture and static charges. Lightweight paperboard packages will also reduce shipment costs.

For storing the CD on its holding section an edge may be provided at the end of the section that is to be inserted into the pouch; the folded edge thereof will then carry the CD along when this section is removed from the pouch. As the CD may bump onto the free edge when it is inserted into the pouch on this section the edge is preferably provided with a semicircular groove, which, however skips a minimal width of the edge to produce a "pull along effect".

The pouch-like section may further be provided with an opening for grasping the central CD opening. It is further possible to arrange a fleece fabric on the CD holding section and on the upper inside of the pouch-like section, so that dust particles, which may otherwise cling to the CD while inserting or removing it, may be wiped off.

The section holding the CD may additionally have collar holders adhered thereto, the shape of which corresponds to the shape of the CD in order to laterally hold the CD (not shown in FIGS.).

It is a special advantage of the invention that by using a.m. configuration of the sections the mechanically and manually operated cover is made up from a double paperboard layer, which makes it as solid as the pouch-like section that is inserted into the insertion section holding the CD. The folding edge between the pouch-like section and the cover section is furthermore protected from overexertion and too much bending by a maximum opening angle of 180°.

Punched-out grasping openings or punches resp. indentations corresponding to the CD shape may assist the CD-abutting sections in their holding or presenting function.

The following description relates to a preferable embodiment of the invention.

DESCRIPTION OF PREFERRED EMBODIMENTS

Figure 1:
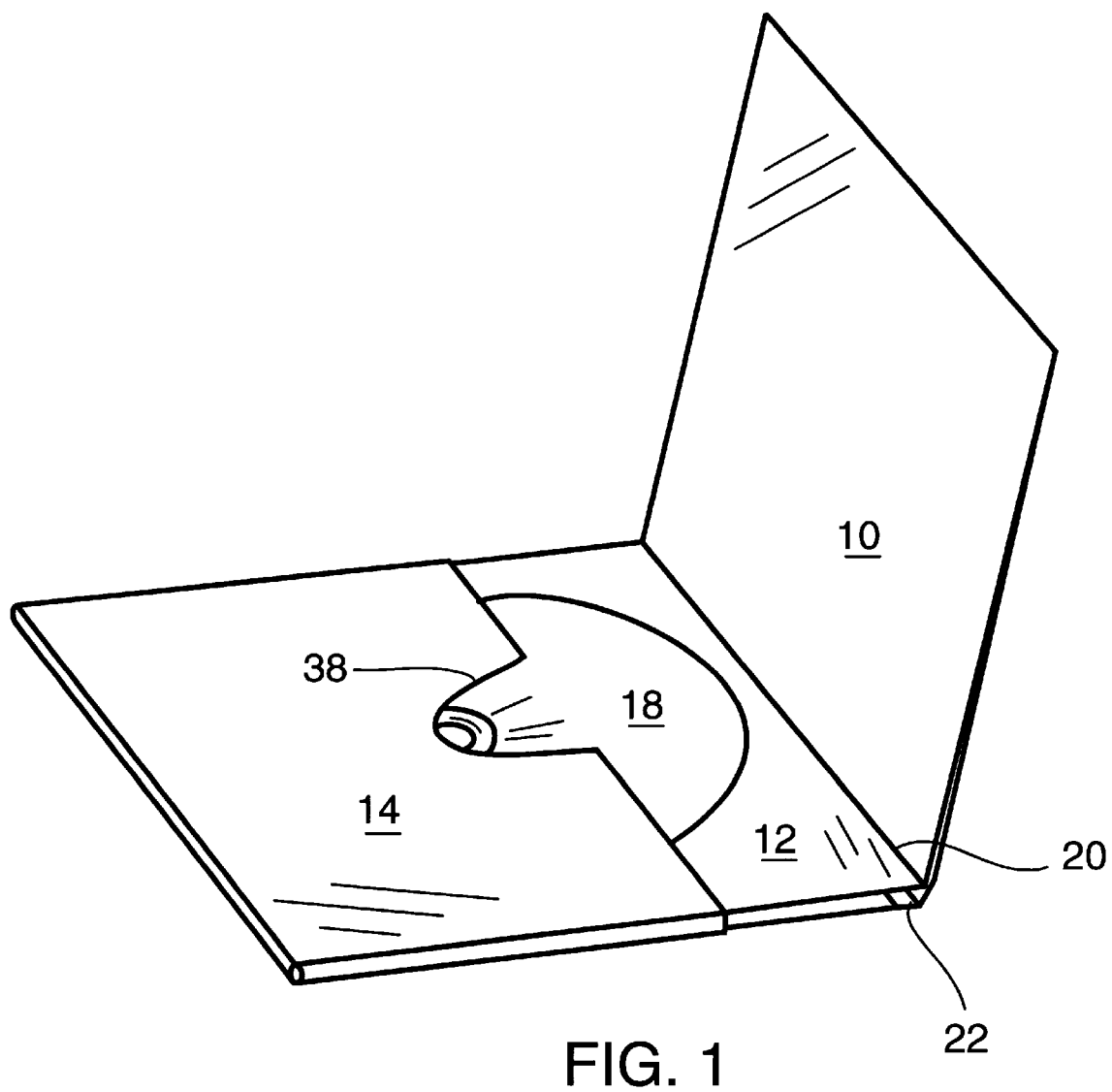
FIG. 1 shows a CD package opened at about 90°; the CD is partly pushed out of the pouch-like section.
Figure 2:
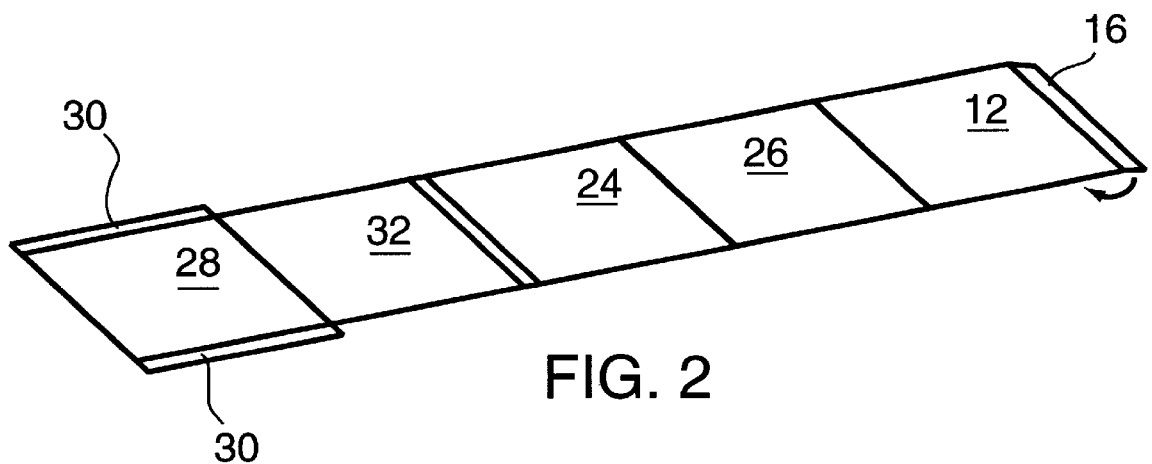
FIG. 2 shows the cut of the CD package prior to folding.
Figure 3:
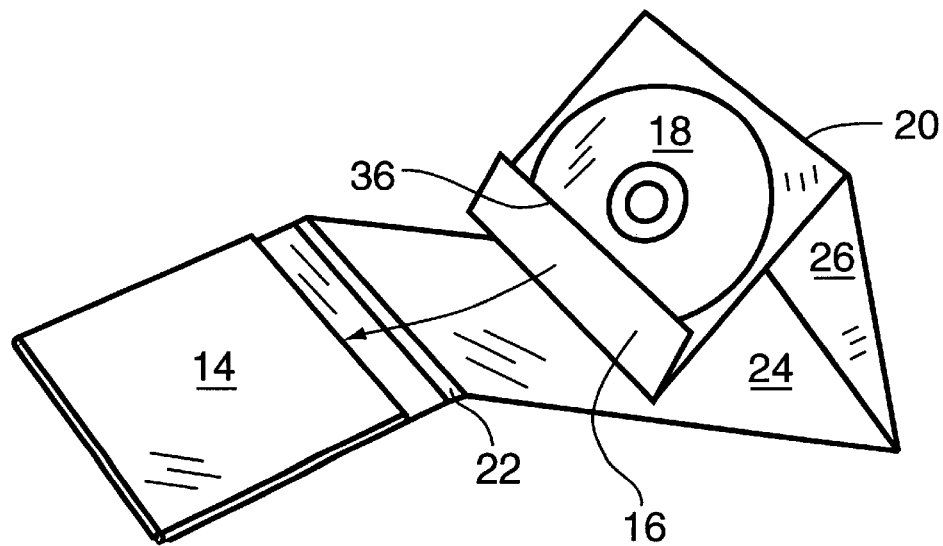
FIG. 3 shows the folding of the CD package with already applied CD.

FIGS. 1 to 3 show a CD package consisting of a cover section 10, a CD holding section 12 on which CD 18 is shown and a pouch-like section 14. The Figs. show how the paperboard section 26, which is shorter than section 24, i.e. the inside of cover 10 opposite to the outside, the hinged edge between the CD holding section 12 and the inside of the cover and at least one pivot edge 22 between the outside 32 of pouch-like section 14 and the outside 24 of the cover a relative movement of the insertion section 12 holding the CD to the pouch-like section occurs when cover 10 is hinged open in relation to the pouch-like section 14. This relative movement causes the CD to be pushed out, so that it may be removed more easily and also presented in a better way.

For holding the CD on the insertion section 12 an edge 16 joining the free end of the insertion section 12 is folded in such a manner that it holds the CD and draws it out of the pouch-like section when cover 10 is unfolded.

To prevent CD 18 from bumping on straight edge 36 (of FIG. 3) before it reaches its final position, edge 36 may be provided with a partly circular groove corresponding to the dimensions of the CD, so that at the same time a certain stability of the CD is achieved. It is also possible to provide additional paperboard sections adhered to section 12 on at least its two outer edges that are not covered by the CD, and thereby hold the CD.

Wide unfolding of the package makes it possible to tilt the two sections on the cover side (if provided) off the CD so that they do not prevent a straight removal of the CD along the direction of the pouch. Punched indentations in CD holding section 12 may also be opened and closed by slight bending. This holds especially true for punches along the destined position of the outer diameter of the CD.

FIG. 2 clearly shows that the pouch-like section is formed by folding two narrow collar sections 30 onto the inside 28 of the pouch-like section and folding to side 32. FIG. 3 shows the already formed pouch-like section 14, whereas in contrast to FIG. 1 there is no removal opening provided resp. shown. As soon as the inner sides 24, 26 of the cover are glued together the CD package is protected against disassembling. If gluing is not necessary or desired the package may also be used without glue. It is rather possible to deposit song text or the like on the package as there is significantly more room than usual on the package itself.

Figure 4:
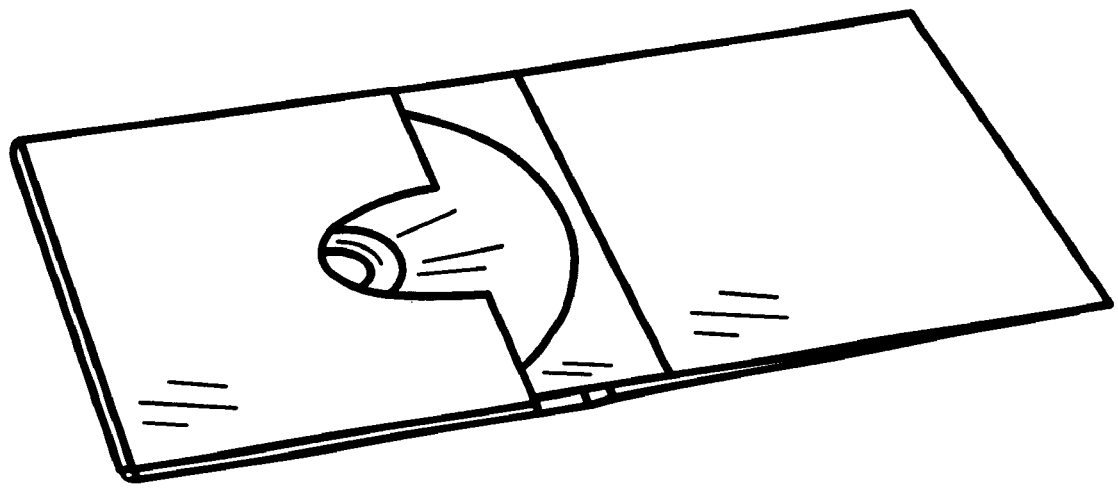
FIG. 4 shows the CD package opened at about 180°.

FIG. 4 shows the opened package opened by 180°. In comparison to FIG. 1 FIG. 4 there is shown how the CD is further removable from the pouch-like section.

Figure 5:
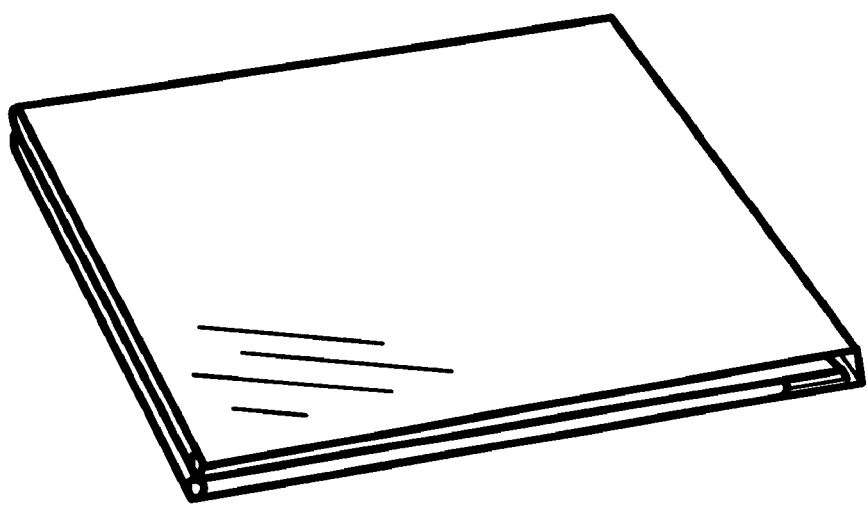
FIG. 5 shows the closed CD package.

FIG. 5 shows the closed CD package, which, when proportioned in accordance with DIN regulations, may be offered for sale like the commonly known plastic For easy closing the package may further be provided with a Velcro fastener.

Additionally the package may also be pushed into a slip cover, but it may also be provided with a simple band or a seal to guarantee a purchaser the originality of the CD package.

Figure 6:
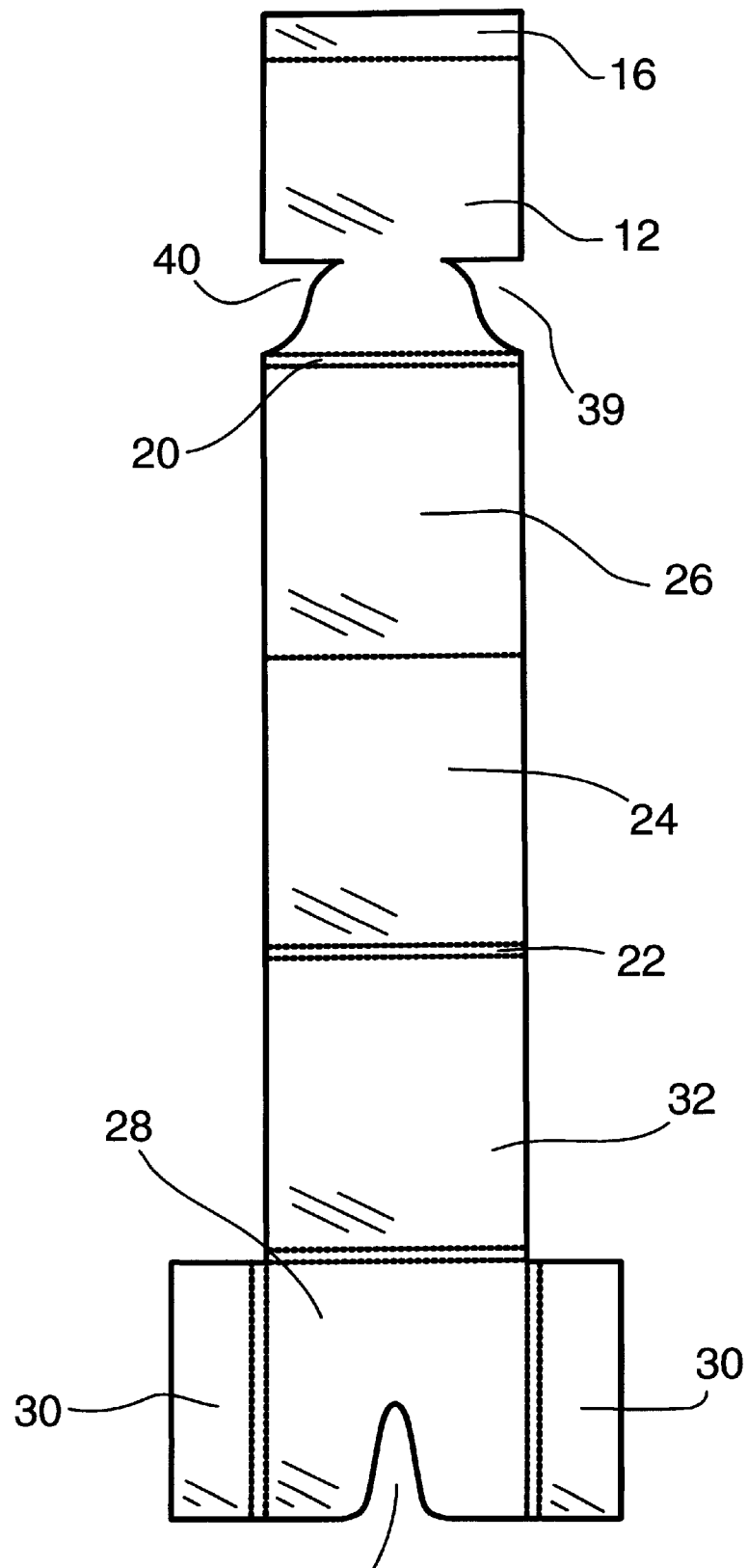
FIG. 6 shows a punching cut for a CD package.

FIG. 6 shows a punching cut of an improved embodiment of the CD package, which is provided with two lateral grip openings 39, 40 for easier removal of the CD from the package.

I claim:

1. A foldable compact disc packages, comprising a section (12) holding the compact disc, a cover section (10) hinged thereon and a pouch section (14) into which the section holding the compact disc can be inserted, characterised in that the cover section (10) is connected to the pouch section (14) via an edge acting as a pivot axis (22) and that said pivot axis (22) is spaced apart from a hinged connection (20) between the cover section (10) and the section (12) holding the CD so that the section holding the compact disc is partly pulled out from the pouch section (14) when the package is opened by the resultant relative movement of the pivot pivot axis and hinged connection for ease of removal for presenting.

2. A compact disc package according to claim 1, characterised in that it is provided with a folded edge portion (16) holding the compact disc on the section (12) holding the compact disc while the compact disc is removed.

3. A compact disc package according to claim 2, characterised in that it is provided with a partly circular groove on a free edge of a narrow edge portion (16).

4. A compact disc package according to claim 3 characterised in that at least parts of at least some of the sections are covered by fleece material, for contact with the compact disc.

5. A compact disc package according to claim 3 characterised in that it is provided with punches corresponding to the compact disc dimensions, corresponding to part of the entire periphery of the compact disc in the section (12) holding the compact disc for lateral storage of the compact disc to prevent slipping on the section (12) holding the compact disc.

6. A compact disc package according to claim 3 characterised in that the section (12) holding the compact disc is provided with lateral grip openings (39, 40) in order to facilitate removal of the compact disc from the package.

7. A compact disc package according to claim 2 characterised in that it is provided with a grasping opening (38) on the inside of pouch section (14).

8. A compact disc package according to claim 2 characterised in that at least parts of at least some of the sections are covered by fleece material, for contact with the compact disc.

9. A compact disc package according to claim 2 characterised in that it is provided with punches corresponding to the compact disc dimensions, corresponding to part of the entire periphery of the compact disc in the section (12) holding the compact disc for lateral storage of the compact disc to prevent slipping on the section (12) holding the compact disc.

10. A compact disc package according to claim 2 characterised in that the section (12) holding the compact disc is provided with lateral grip openings (39, 40) in order to facilitate removal of the compact disc from the package.

11. A compact disc package according to claim 1 characterised in that it is provided with a grasping opening (38) on the inside of pouch section (14).

12. A compact disc package according to claim 11 characterised in that at least parts of at least some of the sections are covered by fleece material, for contact with the compact disc.

13. A compact disc package according to claim 11 characterised in that it is provided with punches corresponding to the compact disc dimensions, corresponding to part of the entire periphery of the compact disc in the section (12) holding the compact disc for lateral storage of the compact disc to prevent slipping on the section (12) holding the compact disc.

14. A compact disc package according to claim 11 characterised in that the section (12) holding the compact disc is provided with lateral grip openings (39, 40) in order to facilitate removal of the compact disc from the package.

15. A compact disc package according to claim 1 characterised in that at least parts of at least some of the sections are covered by fleece material, for contact with the compact disc.

16. A compact disc package according to claim 15 characterised in that it is provided with punches corresponding to the compact disc dimensions, corresponding to part of the entire periphery of the compact disc in the section (12) holding the compact disc for lateral storage of the compact disc to prevent slipping on the section (12) holding the compact disc.

17. A compact disc package according to claim 15 characterised in that the section (12) holding the compact disc is provided with lateral grip openings (39, 40) in order to facilitate removal of the compact disc from the package.

18. A compact disc package according to claim 1 characterised in that it is provided with punches corresponding to the compact disc dimensions, corresponding to part of the entire periphery of the compact disc in the compact disc holding section (12) for lateral storage of the compact disc to prevent slipping on the section (12) holding the compact disc.

19. A compact disc package according to claim 18 characterised in that the section (12) holding the compact disc is provided with lateral grip openings (39, 40) in order to facilitate removal of the compact disc from the package.

20. A compact disc package according to claim 1 characterised in that the compact disc holding section (12) is provided with lateral grip openings (39, 40) in order to facilitate removal of the compact disc from the package.

* * * * *